United States Patent [19]

Chan

[11] Patent Number: 4,539,751
[45] Date of Patent: Sep. 10, 1985

[54] BARBEQUE FORKS

[76] Inventor: Siu-Por Chan, Room 805, 8th Floor Yat King House, Lai King Estate, Kowloon, Hong Kong

[21] Appl. No.: 545,096

[22] Filed: Oct. 25, 1983

[30] Foreign Application Priority Data

Nov. 1, 1982 [GB] United Kingdom ................ 8231191

[51] Int. Cl.³ .............................................. A47J 43/28
[52] U.S. Cl. ....................................... 30/322; 30/323; 99/421 A
[58] Field of Search ................ 30/322, 323, 327, 137; 403/300, 307; 16/115, 114 R; 99/421 A

[56] References Cited

U.S. PATENT DOCUMENTS

| | | | |
|---|---|---|---|
| 286,668 | 10/1883 | Wiswell | 30/323 |
| 1,034,909 | 8/1912 | Graybill | 403/307 |
| 1,121,657 | 12/1914 | Parker | 30/322 |
| 1,701,985 | 2/1929 | Ponto | 403/307 |
| 2,502,435 | 4/1950 | Curtis | 403/300 |
| 2,522,223 | 9/1950 | Hardin | 99/421 A |
| 3,201,158 | 8/1965 | Meripol | 403/307 |
| 3,266,144 | 8/1966 | Fishlove | 30/322 |
| 4,126,086 | 11/1978 | Valade | 99/421 A |

Primary Examiner—Jimmy C. Peters
Attorney, Agent, or Firm—Warren B. Kice

[57] ABSTRACT

Because barbeque forks tend to be rather unwieldy items a barbeque fork is provided which can be separated into a number of shorter pieces or lengths for storage and the pieces then assembled end to end by connecting means before use. Preferably such connecting means comprise a screw-threaded spigot on one piece and a corresponding screw-threaded socket on the adjacent piece. To avoid difficulties in unscrewing the connection means with greasy hands, however, when there are more than three pieces or sections, gripping means such as outwardly projecting lugs are provided the or each section which is not one containing the handle or the prongs. Also to assist in propping up the fork a supporting member, axially slidable along the shaft, can be provided, the supporting member comprises a pair of domed plates placed back to back and each plate having a number of outwardly projecting arms.

6 Claims, 4 Drawing Figures

BARBEQUE FORKS

BACKGROUND OF THE INVENTION

Barbeque forks tend to be rather unwieldy items when they are being transported from place to place since of necessity they must be quite long and so there is always the danger that the pointed prongs may injure other people or damage their clothing.

BRIEF SUMMARY OF THE INVENTION

According to the invention therefore, a barbeque fork is provided whose shaft can be separated into a number of shorter pieces or lengths for storage and the pieces then assembled end to end by connecting means before use.

One problem with such a barbeque fork is that the connecting means used to join the various parts need to be relatively sturdy so that the assembled barbeque fork has a reasonably rigid feel. One suitable form of connecting means is a bayonet and socket connection but the presently preferred connecting means consist of a screw-threaded spigot and socket. Also the screw-threaded spigot may have a flange which abuts the socket to limit the extent to which the screw-thread enters the socket so that the ends of the shaft do not touch.

After use of the barbeque fork, however, the user's hands will generally be greasy and it is found that it is not easy to unscrew or unlock all of the sections from one another when there are more than three sections because the surfaces of the rod-like shaft of the barbeque fork will be too slippery.

The user can grip the handle and the prongs of the fork quite firmly and so undo from the rest of the fork either the handle section or the prong section. However, the user cannot easily separate the remaining sections. Thus, he will have either the handle or the prongs to grip with one hand but he will have nothing but the smooth round surface of the shaft to grip with the other hand.

Therefore, according to one aspect of the invention, the or each section of the barbeque fork which is not a section containing the prongs or the handle is provided with gripping means fixed to that section to enable the user to separate that section from an adjacent section even if his fingers are greasy. In one simple embodiment according to the invention, these gripping means can comprise a number of outwardly projecting lugs.

As noted above, the preferred connecting means between the various parts of the barbeque fork include a screw thread on the end of one section which engages within an internally threaded bush or socket on another section. In a particularly preferred embodiment the bush can be integrally provided with the lugs which the user grips to help in unscrewing adjacent sections.

It is desirable that the barbeque fork be collapsible for storage into relatively short lengths but equally too many sections is not desirable. There are preferably a total of three or four sections into which the barbeque fork can be separated and in the case where there are three sections, it is the central section which needs to be provided with the gripping means whilst in the case of four sections, it is the two central sections which need to be provided with the gripping means.

When barbeque forks are used at an outdoor picnic it is very convenient not to have to hold the fork all the time. Thus, it is desirable to be able to prop up the fork carrying the food in such a way that it only needs to be picked up from time to time to turn the food so that the food cooks evenly. The shaft of the fork is therefore desirably provided with some means to lodge the fork on a stone, the rim of a barbeque or whatever happens to be available.

Therefore, according to another feature of the invention the shaft is provided with a supporting member which is axially slidable along at least part of the shaft, the supporting member comprising a pair of domed plates placed back to back and each having, in axial section a number, preferably three, outwardly projecting arms which are spaced, e.g. equallly, around the axial direction.

Such a support member can be lodged or wedged in a temporary fashion against stones or over the rim of a barbeque pit or the like in a relatively secure manner so that the user's hand does not have to support the full weight of the fork plus the food, as to do so for long periods is tiring on the wrist. Since the support member slides axially it can be positioned near to the balancing point of the fork allowing the sitting or squatting user to lower the hand holding the fork to a much lower and more comfortable position, while the fork prongs and the food remain elevated over the fire. If the handle of the fork is placed on the ground and a stone or weight placed on it, the user can safely leave the fork unattended for a time, a practice dangerous without the support member as the fork will often slide sideways off the barbeque pit rim, stones, or whatever it is resting on, landing the food in the dirt or the fire.

In addition the arms can be serrated to assist in securing the support member in place.

DESCRIPTION OF THE DRAWINGS

Examples of barbeque forks according to the invention will now be described, with reference to the accompanying drawings, in which.

DESCRIPTION OF THE PREFERRED EMBODIMENTS

Figure 1:
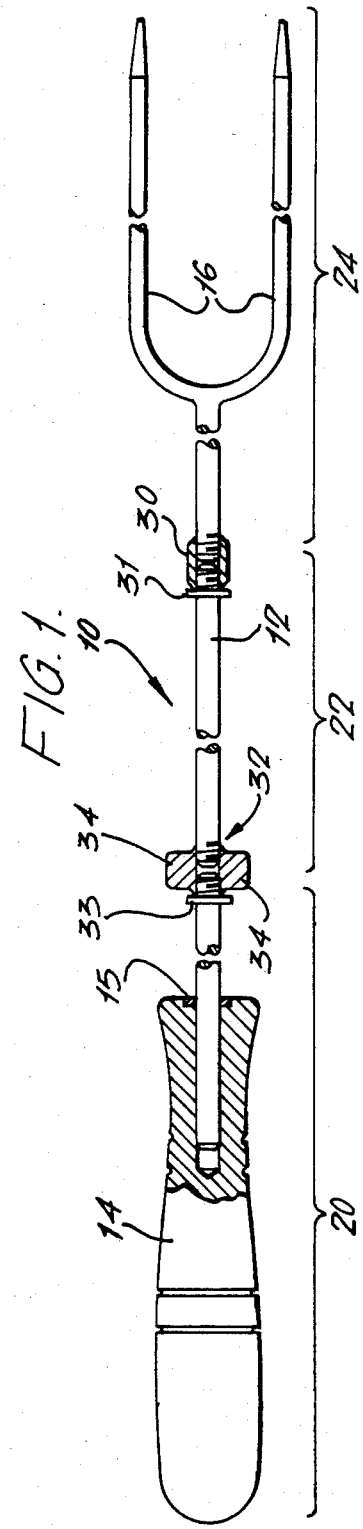
FIG. 1 is a sectional elevation showing the fork.

A barbeque fork 10 shown in FIG. 1 comprises a rod-like shank 12 at one end of which is a handle 14 and at the other end of which are pointed pronts 16. The latter have been formed by bending into a U-shape a piece of rod of similar material to that forming the shaft 12 and braising or welding the end of the shaft 12 to the middle section of the U-shaped piece. Preferably the diameter of the rod forming the prongs 16 is less than that forming the shank 12 so as to reduce heat conduction.

So that the fork 10 can be brought into a more compact form for storage and enable it to be carried around more conveniently before and after use, the shaft 12 can be separated to split the fork into three sections 20, 22 and 24. The section 20 includes one end of the shaft which is joined to the handle 14 in the normal fashion by screwing into the handle and/or by means of glue. Also a small metal washer 15 is inserted into the end of the handle to help spread the load between the shaft 12 and handle 14. The section 22 is a central section whilst the section 24 includes the other end of the shaft and the prongs 16. For convenience, the overall axial length of each section 20 to 24 is approximately the same and then the three sections can be placed side by side in a suitable holder.

On the end of the section 24 has an internally threaded socket 30. This is, for example, joined to the shaft of the section 24 by screw threads and is permanently wedged in place by having been forced onto the shaft up to the end of the screw-threading on the shaft. The corresponding end of the section 22 also has a screw-threading and to join the sections 22 and 24 together, the end of the section 22 is screwed into the socket 30. The screw threading needs to be of relatively high quality such as a coarse second class thread so as to avoid binding in the event of dirt being present in the turns of the thread yet at the same time giving a secure firm join. As an alternative an integral flange 31 may be provided near the end of the section 22 to limit the extent to which the section 22 can be screwed into the socket. In this way I have found that the treading on the end of the section 22 can be simply machine finished and yet can still give a tight secure join when the fork is assembled.

In a similar fashion, joined to the other end of the section 22 is another socket 32 similar to the socket 30. Again in a similar fashion, the end of the shaft in the section 20 can be threaded into that socket 32 to assemble the barbeque fork. Additionally an integral flange 33 similar to the flange 31 can be provided but is not essential.

The socket 32, however, has a pair of outwardly projecting lugs 34 whose purpose is to enable the user to grip the central section 22 more securely when he wishes to unscrew the parts. Thus after use when the fork 10 is to be disassembled, the user can grip the handle and the prongs 16 and readily undo one or other of the joins between the sections 20 and 22 or between the sections 22 and 24. Having undone one of the connections, however, he will be left either with the handle section 20 joined to the central section 22 or the prong section 24 joined to the central section 22 and in the absence of the lugs 34, he will often have no secure way of gripping the central section 22 to separate it from the other section. The problem is particularly acute if the user's hands are greasy as is likely to be the case after barbequeing. The user can however grip the lugs 34 and these allow him to separate that central section 22 from the remaining section.

Although the fork 10 is shown as having only a single central section 22, the fork could for example be made up of four sections in which case there will be two central sections similar to the section 22. It may also be convenient to provide a third central prong 16 instead of the pair of prongs. Further, more than two lugs 34 could be provided on the socket 32.

Figure 2:
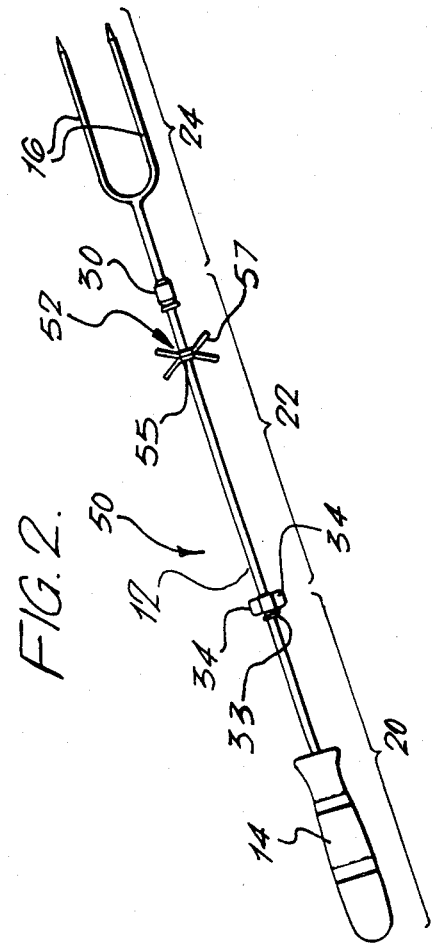
FIG. 2 is a modified fork according to another aspect of the invention.

The modified fork 50 shown in FIG. 2 only differs significantly from the fork 10 in the provision of a support member 52 which is axially slidable along the shaft 12. The member is shown as positioned on the shaft in the central section 22 but this is not critical and it could be positioned anywhere along the shaft 12 as desired.

Figure 3:
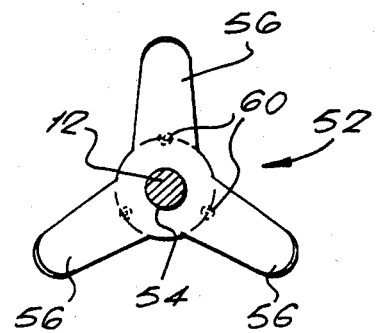
FIG. 3 is an enlarged axial view of a support member used in the modified fork shown in FIG. 2.
Figure 4:
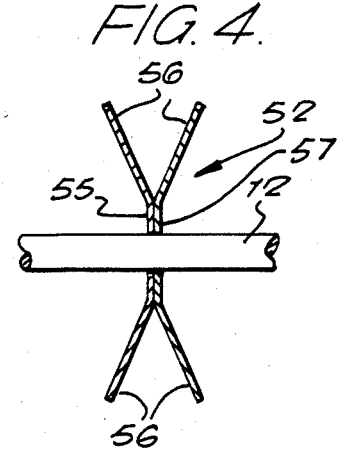
FIG. 4 is an enlarged side view showing the support member on the shaft of the fork.

As best shown in FIG. 3, the support member 52 has a central axial hole 54 through which the shaft 12 extends to enable the member to slide freely along the shaft. The member has been formed from two pieces 55 and 57 of slightly resilient sheet metal and each piece has three radially projecting arms 56 spaced at 120° to one another. Each piece is domed and has flat central portions 58 and 59 which are placed back to back and have been locally joined by, for example, spot welds 60. The arms 56 are bent relative the portions 58 and 59 to give the domed shape to each pieces 55 or 57.

This support member 52 provides good support to enable the fork 50 to be propped up on any convenient device which happens to be available. Thus, if the user is barbequeing in the countryside, there are often stones or rocks on which the member 52 can be wedged by means of the arms 56. Equally, for home barbecuing, there will often be a rim or edge to a barbeque over which the member 52 can be lodged with the splayed arms engaging over that rim or edge.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A barbeque fork comprising a shaft, a handle at one end of said shaft, prongs for supporting food at the other end of said shaft, said shaft being capable of being separated into a number of shorter lengths for storage, connecting means for holding said lengths assembled end-to-end for use, said connecting means comprising a screw-threaded spigot formed by screw-threading on one end of one length and a corresponding internally screw-threaded socket formed in a collar joined on the end of an an adjacent length, and a flange attached to said end of said one length, said flange abutting said socket to limit the extent to which said screw-thread can enter said corresponding socket so that the end of said one length does not touch the end of said adjacent length.

2. A barbeque fork according to claim 1 in which there are at least three of said lengths; and in which one length carries said prongs, another length carries said handle, and the remaining length further comprises gripping means fixed thereto to assist the user to separate that length from an adjacent length.

3. A barbeque fork according to claim 2 in which said gripping means comprises a number of outwardly projecting lugs.

4. A barbeque fork according to claim 3 in which said lugs are integrally formed with said connecting means.

5. A barbeque fork according to claims 1, 2, 3, or 4 further comprising a supporting member axially slidable along at least part of the shaft, said supporting member comprising a pair of domed plates placed back-to-back and each having, in axial section, a number of outwardly projecting arms.

6. A barbeque fork comprising:
a shaft separable into at least three lengths for storage, said lengths being assembled end-to-end for use,
a handle at one end of said shaft when assembled for use, said handle being joined to one of said lengths,
prongs for supporting food at the other end of said shaft, said prongs being attached to another of said lengths,
connecting means for assembling the shafts end-to-end for use, said connecting means comprising a screw-threaded spigot formed by screw-threading at the end of one length and a corresponding internally screw-threaded socket formed in a collar joined on the end of an adjacent length, a flange attached to said end of said one length to limit the extent to which said screw-thread can enter said corresponding socket, said flange having a surface to abut said socket whereby the screw-threaded end of said one length does not touch the end of said adjacent length, and gripping means integrally formed with said collar attached to at least one of the remaining lengths of said shaft, to assist the user to separate said latter length from an adjacent length.

* * * * *